(12) United States Patent
Southard

(10) Patent No.: US 9,010,017 B2
(45) Date of Patent: Apr. 21, 2015

(54) APPARATUS AND METHOD FOR CONTROLLING BEDBUGS

(76) Inventor: Michael Southard, Sherwood, OR (US)

( * ) Notice: Subject to any disclaimer, the term of this patent is extended or adjusted under 35 U.S.C. 154(b) by 0 days.

(21) Appl. No.: 13/277,105

(22) Filed: Oct. 19, 2011

(65) Prior Publication Data

US 2014/0013655 A1   Jan. 16, 2014

Related U.S. Application Data

(60) Provisional application No. 61/394,677, filed on Oct. 19, 2010.

(51) Int. Cl.
*A01M 1/06* (2006.01)
*A01M 3/00* (2006.01)

(52) U.S. Cl.
CPC ............. *A01M 3/005* (2013.01); *A01M 3/007* (2013.01)

(58) Field of Classification Search
USPC .............................. 43/113, 139, 132.1; 15/344
See application file for complete search history.

(56) References Cited

U.S. PATENT DOCUMENTS

| | | | | |
|---|---|---|---|---|
| 4,642,841 A * | 2/1987 | Berfield et al. | | 15/330 |
| 5,926,997 A * | 7/1999 | Wilcox | | 43/60 |
| RE40,646 E * | 3/2009 | Nelson et al. | | 43/107 |
| 7,832,140 B2 * | 11/2010 | Wilbanks | | 43/112 |
| 7,988,984 B2 * | 8/2011 | Hockaday | | 424/403 |
| 8,109,036 B1 * | 2/2012 | Wilbanks | | 43/112 |
| 2007/0256351 A1 * | 11/2007 | Milton | | 43/139 |
| 2009/0094883 A1 * | 4/2009 | Child | | 43/112 |
| 2009/0277074 A1 * | 11/2009 | Noronha | | 43/113 |
| 2010/0132248 A1 * | 6/2010 | Durand et al. | | 43/139 |
| 2010/0229459 A1 * | 9/2010 | Simchoni-Barak et al. | | 43/112 |
| 2011/0283597 A1 * | 11/2011 | Coventry | | 43/107 |
| 2012/0055073 A1 * | 3/2012 | Darby | | 43/107 |
| 2012/0137569 A1 * | 6/2012 | Younts | | 43/139 |
| 2012/0159836 A1 * | 6/2012 | Brown | | 43/113 |
| 2013/0014429 A1 * | 1/2013 | Meskouris et al. | | 43/139 |
| 2013/0298447 A1 * | 11/2013 | Chen | | 43/139 |

* cited by examiner

*Primary Examiner* — Rob Swiatek
*Assistant Examiner* — Morgan T Barlow
(74) *Attorney, Agent, or Firm* — Wood, Phillips, Katz, Clark & Mortimer

(57) ABSTRACT

A collector of adult insects, their eggs and larvae has a vacuum-producing motor disposed within a housing. An inlet nozzle is used to draw the targeted organisms into the housing along a flow path featuring grids heated to a degree sufficient to kill the organisms. Mechanical expedients such as fan blades can be disposed in the flow path to apply mechanical killing forces and to blow debris off of adjacent grids. The organisms are directed to a collector which can be heated and which can contain insecticidal substances to provide additional killing expedients for the collected organisms. The flow rate and temperature ranges are adjustable to create sufficient heat and time of contact to kill selected organisms. The collector is especially useful for treating bedbug infestations without the need for toxic chemicals, long-term treatments which make the space being treated uninhabitable and other more extreme treatment regimens.

11 Claims, 4 Drawing Sheets

| Temperature (°F) | Bed Bug (Eggs) | Bed Bug (Adults) | German Cockroach (Male Adults) | Flour Beetle (Adults) | Drywood Termite (Nymphs) | Argentine Ant (Adults) |
|---|---|---|---|---|---|---|
| 115 | 480 | 90 | 58 | 123 | 265 | 8 |
| 120 | 90 | 2 | 27 | 16 | 30 | 4 |
| 125 | <1 | <1 | 16 | 9 | 10 | 2.5 |
| 130 | <1 | <1 | 7 | 4 | 6 | 1 |

Time, in minutes, required for 100% mortality of:

APPARATUS AND METHOD FOR CONTROLLING BEDBUGS

This application claims priority from U.S. Provisional Patent Application 61/394,677, filed Oct. 19, 2010 and entitled "Apparatus and Method for Controlling Bedbugs", which is hereby incorporated herein by reference in its entirety.

BACKGROUND OF THE INVENTION

The bedbug, a well-known pest, has enjoyed a recent resurgence. While theories and explanations for the cause of increased numbers of bedbugs are many, the most frequently expressed are the discontinuance of lethal pesticides, a growing resistance to pesticides, and the presence of bedbugs and larvae in imported goods and packaging for goods. It has been reported that bedbugs cannot survive a temperature above 115 degrees Fahrenheit (46 degrees Centigrade), and various devices and methods have attempted to take advantage of this fact.

One example, U.S. Pat. No. 7,690,148 (Hedman) teaches and describes a method of treating pests which comprises heating an enclosed space to a temperature above that necessary to kill insects such as bedbugs, bedbug larvae, and eggs. The '148 patent and related U.S. Pat. Nos. 6,892,491 and 6,327,812 all describe variations of this approach to controlling insect infestations.

U.S. Pat. No. 5,806,238 teaches and describes a biological vacuum device to enhance environmental quality in which a vacuum cleaner has a vacuum wand and a heated air exhaust tube. Heated air from the exhaust tube is used to flush bedbugs from their hiding places while the vacuum wand is used to collect them.

The foregoing patents are incorporated herein by reference as fully as if they had been set forth in their entireties herein.

Heating an entire enclosed space such as a residence is time consuming, costly, requires a great deal of equipment, is not adapted to be performed often and may damage some of the contents of the space. The use of the device described in the '238 patent requires visual location and identification of insects and further requires the collected insects, which may still be alive, to be properly killed.

I have determined that the collection and eradication of bedbugs may be accomplished through use of a combination vacuum and heating device which is of a convenient size, may be used frequently and will not only collect but kill adult bedbugs and their larvae and eggs within the device and its collection system.

BRIEF DESCRIPTION OF THE DRAWINGS

These and further aspects of the present invention may best be appreciated upon consideration of the accompanying drawings in which.

DETAILED DESCRIPTION OF THE DRAWINGS

While the following describes a preferred embodiment or embodiments of the present invention, it is to be understood that this description is made by way of example only and is not intended to limit the scope of the present invention. It is expected that alterations and further modifications, as well as other and further applications of the principles of the present invention will occur to others skilled in the art to which the invention relates and, while differing from the foregoing, remain within the spirit and scope of the invention as herein described and claimed. Where means-plus-function clauses are used in the claims such language is intended to cover the structures described herein as performing the recited functions and not only structural equivalents but equivalent structures as well. For the purposes of the present disclosure, two structures that perform the same function within an environment described above may be equivalent structures.

Figure 1:
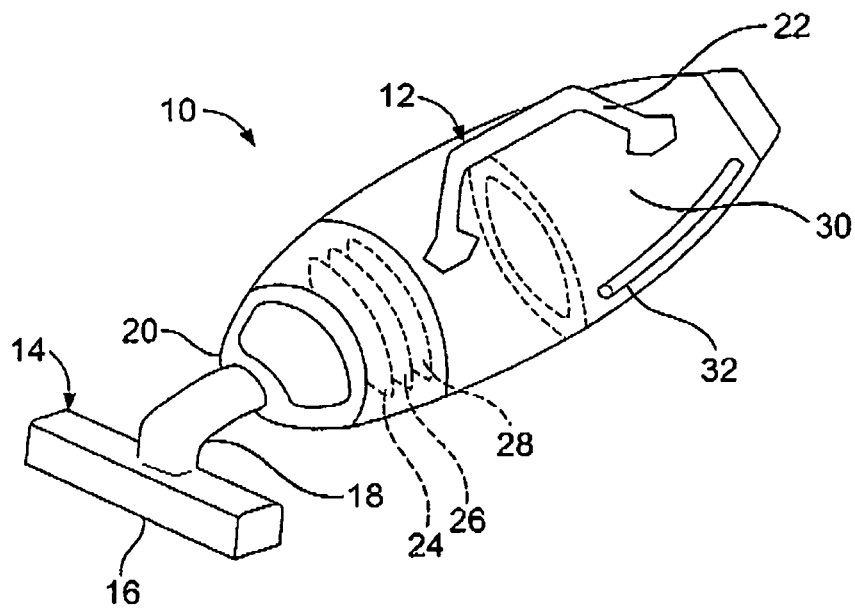
FIG. 1 is a partial schematic perspective view of the assembled vacuum bedbug collector.

Referring now to FIG. 1, the numeral 10 identifies generally a heated vacuum cleaner for the collection of bedbugs and larvae and eggs. Cleaner 10 has a body 12 to which a collection nozzle 14 is removably attached. Nozzle 14 has a collection port 16 at one end thereof communicating with a neck 18 which, in turn, is inserted into collection port 20 of body 12. A handle 22 is attached to the exterior of cleaner body 12.

Shown schematically in FIG. 1 are collection grids 24, 26 and 28, a collection bag 30 and a source of ultraviolet light 32.

Figure 2:
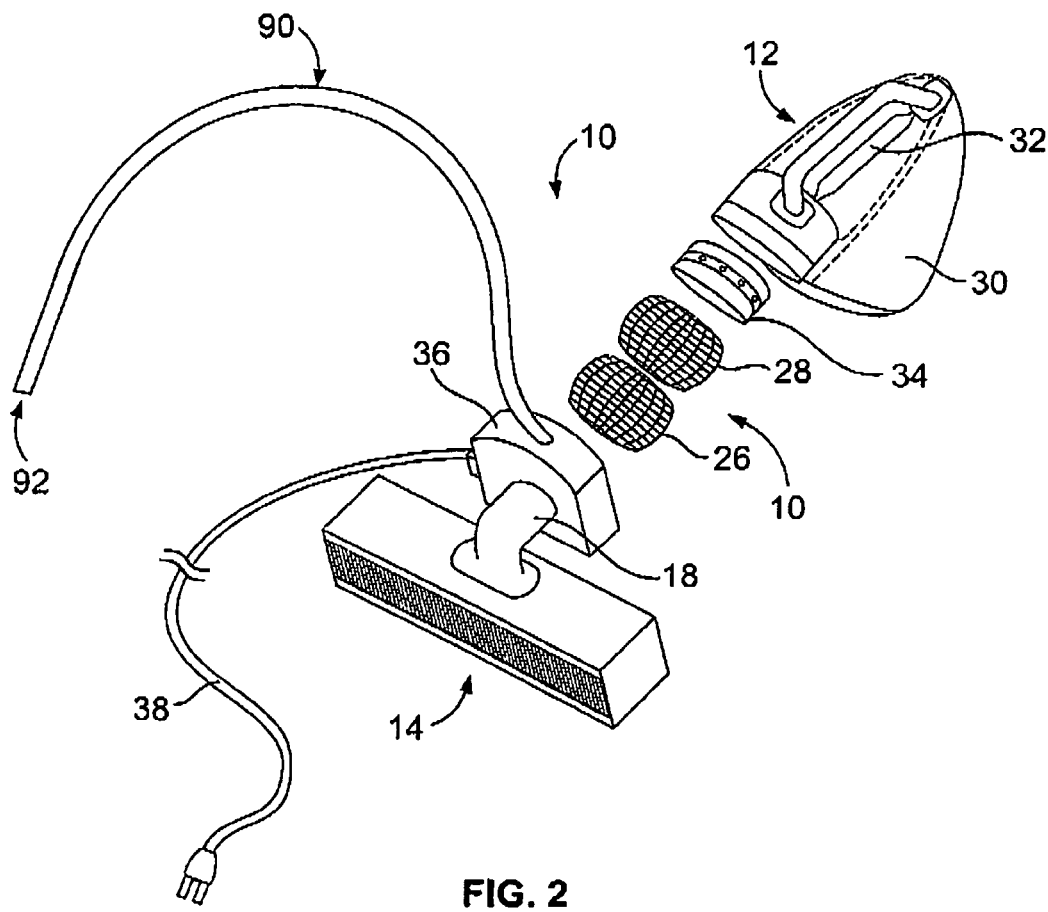
FIG. 2 is an exploded view of the device of FIG. 1.

Referring now to FIG. 2, an exploded view of vacuum unit 10 is shown. In particular, body 12 is shown as having been removed to reveal the placement of vacuum motor 34 and thermal grids 26 and 28. In the embodiment shown, grids 24, 26 and 28 and motor 34 are preferably permanently mounted in front housing 36. A power cord 38 is used to provide electrical energy to grids 24, 26 and 28 and motor 34.

It is a feature of the present invention that the grids 24, 26 and 28, or any selected number of similar grids are electrically energized and heated to a temperature above that temperature at which bedbugs, their larvae and eggs are destroyed. It is also a feature that one or more of grids 24, 26 and 28 is charged with a sufficient electrical voltage to destroy bedbugs, their larvae and eggs.

As has presently been reported in the prior art, exposure to 115 degrees F. for seven minutes will kill all forms of bedbugs, larvae and eggs. For purposes of convenience throughout the term "bedbug organisms" shall be understood to include bedbugs, their larvae and eggs, as well as any other insects or pests to be collected.

It is anticipated that heating grids 24, 26 and 28 to a temperature higher than 115 degrees F. may cause the destruction of the bedbug organism in a shorter time span.

When motor 34 is energized, a vacuum is drawn through nozzle 14 allowing the bedbug organisms to be collected and thereafter directed to housing 36 and grids 24, 26 and 28. After passing through grids 24, 26 and 28, the bedbug organisms are directed to a collection bag 30 in housing 12. When collection is complete, bag 30 is emptied in a manner which will prevent the re-entry of any collected bedbug organisms into the space just cleaned.

In the embodiment shown, an ultraviolet light 32 is positioned within collection bag 30. It is believed that the presence of ultraviolet light 32 may have an efficacious effect on the destruction of any bedbug organisms that may survive passage through grids 24, 26 and 28.

Figure 3:
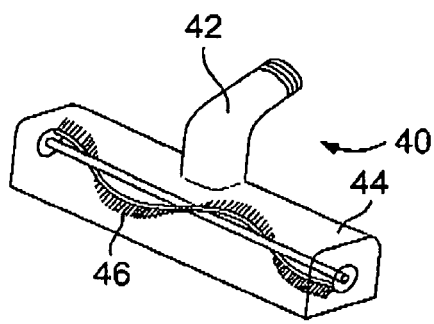
FIG. 3 is a partial sectional plan view of a nozzle for the device of FIG. 1 using a rotary brush.

Referring now to FIG. 3, the numeral 40 identifies a vacuum nozzle having a connection neck 42 and a body 44 within which a rotating brush 46 is located. Use of brush 46 provides agitation of the surfaces being vacuumed which, it is anticipated will dislodge bedbug organisms.

Figure 4:
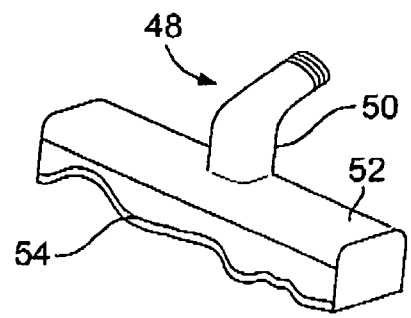
FIG. 4 is a partial perspective view of a nozzle having a flexible and deformable perimeter.

Referring now to FIG. 4, the numeral 48 identifies a nozzle having a collection stem 50, a body 52 and a flexible, pliable and distortable lip 54, useful for wedging nozzle 48 into unusually configured spaces.

It is known that bedbugs lay their eggs in such hiding places in bedding as sewn seams and that adult bedbugs as well as their larvae will conceal themselves in small cracks and crevices. To make collection of bedbug organisms more efficient, collection nozzles such as those shown in FIGS. 5-7 may be used.

Figure 5:
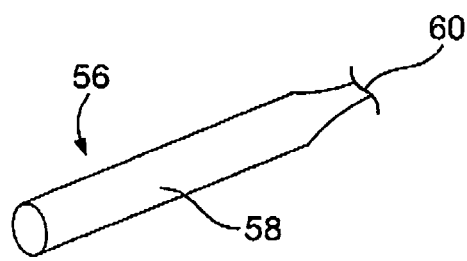
FIG. 5 is a partial perspective view of a crevice wand.

In FIG. 5, the numeral 56 identifies a nozzle having a body 58 sized to fit into port 20 and a tapered tip 60 formed as a "crevice tool" to allow tip 60 to be inserted into smaller and more hidden spaces.

Figure 6:
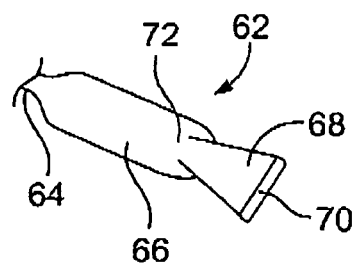
FIG. 6 is a partial perspective view of a second collection wand.

Referring to FIG. 6, the numeral 62 identifies a nozzle having a connecting neck 64, a hollow body 66 and a nozzle end 68 formed in a flattened configuration tapering from a larger dimension at mouth 70 to a smaller dimension where nozzle 68 meets body 66 at 72. Such a configuration provides for a nozzle which will fit into confined spaces and which, due to the tapered configuration of nozzle 68 will accelerate the flow of air into body 66 and, thereby, into vacuum 10.

Figure 7:
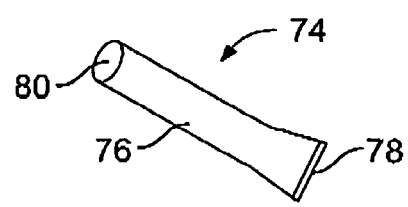
FIG. 7 is a partial perspective view of another collection wand.

Referring now to FIG. 7, the numeral 74 identifies a nozzle having a body 76, at one end of which a flattened, broadened and angled collection port 78 is formed and at the other end of which a port 80 is formed sized to be accommodated by port 20 in vacuum 10.

Figure 8:
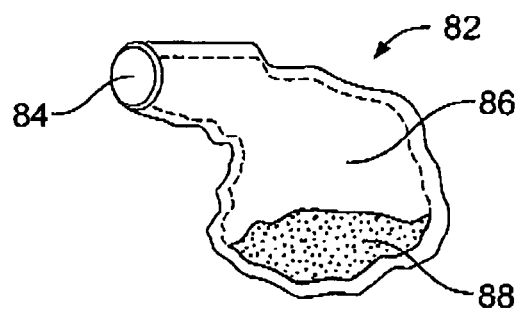
FIG. 8 is a partial sectional plan view of a thermal collection bag.

Referring to FIG. 8, a modified collection bag is identified by the numeral 82. Bag 82 has a bag inlet 84 communicating with a collection chamber 86 within bag 82.

At the bottom of collection chamber 86 is a thermal mass 88 capable of absorbing and holding heat for a period of time. Thermal material such as sand, or other heat capturing material are suitable for this purpose.

Operation of vacuum 10 may now be described. A vacuum device is used to collect bedbug organisms and direct the past and into components in the device hat are heated to a sufficient degree to kill the organisms. In one embodiment, thermal grids 24, 26 and 28 are positioned within housing 36 and are heated electrically to a temperature sufficient to kill bedbug organisms. When motor 34 is energized air is drawn through a selected nozzle such as 14 and, thereby, through housing 46, collected bedbug organisms will be brought into contact with one or more grids 24, 26 and 28 and destroyed by the heat produced by said grids. Thereafter, the destroyed bedbug organisms are collected and held within bag 30 inside body 12. When vacuuming is complete, body 12 is removed and bag 30 is emptied. UV light 32 provides a source of control for those adults, larvae or eggs that may survive the trip into bag 30.

In another embodiment, bag 82 is used to collect vacuumed bedbug organisms after thermal mass 88 has been heated to a temperature sufficiently high to kill them. Controls are provided to not only energize and heat the thermal mass 88 but to keep it at a killing temperature for a sufficient time to effect full eradication of the insects collected even when power to the motor 34 may be interrupted.

In a third embodiment, vacuum 10 includes grids 24, 26 and 28, and bag 82 with thermal mass 88. In this manner, killing of bedbug organisms will occur early on at the grids, and thereafter, within bag 82.

Due to the heat produced by elements such as grids 24, 26 and 28, motor 34 will be manufactured from heat-resistant components, such as ceramic parts used in other heated fan-driven devices such as hair dryers and the like.

The invention has been depicted therein as a hand held unit small enough and maneuverable enough to be picked up and run along mattresses, beneath beds, in corners and the like. It is also contemplated that the foregoing operations can be included in full sized room type vacuum device which may also include a wand extending from the vacuum cleaner and used to collect insect material from smaller or more restricted places. The schematic of such an arrangement is shown in FIG. 2 where a hose 90 is shown connected to housing 36. Hose 90 has a port 92 to which nozzles such as those shown in FIGS. 3-7 are attachable.

Airflow through vacuum cleaner 10 can be adjusted to provide more contact time with grids 24, 26 and 28 to make the destruction of bedbug organisms more efficient. In like fashion, circuit controls can be provided to adjust the temperature and the time of heating within thermal mass 88 to ensure more efficient and thorough destruction of bedbug organisms, collecting and destroying a variety of insects and microorganisms, and the description of the present invention with respect to control of bedbugs should not be read as a limitation of the scope of the present invention.

It is also a feature of the invention that in other embodiments the heated portions of the system (the plates and the collector bag) are turned off and the system is used as a conventional vacuum cleaner. HEPA and other filters can also be used to screen air exhausted from the device to trap unwanted particles, including parts of bedbug organisms.

Figure 9:
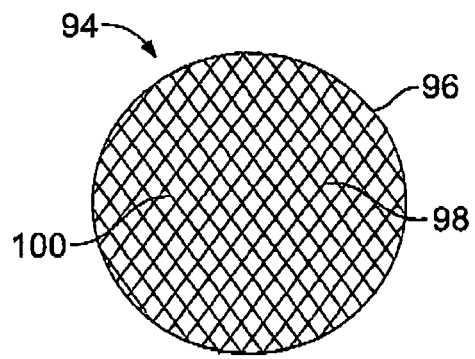
FIG. 9 is a schematic view of an embodiment of a fixed grid thermal screen.

Referring now to FIG. 9, the numeral 94 indicates generally a circular fixed grid suitable for use as plate 24 to 26 or 28. Grid 94 has an outer grid rim 96 and a plurality of horizontal rods 98 intersecting with a plurality of vertical rods 100 to form a pattern of substantially rectilinear spaces through which the air flow from apparatus 10 is directed. Grid 94 is preferably formed from a material that conducts heat efficiently to achieve sufficiently high temperatures to kill the organisms drawn in to contact therewith.

Figure 10:
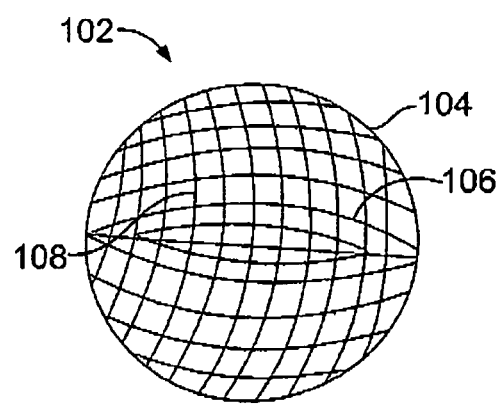
FIG. 10 is a schematic view of an embodiment of another embodiment of a fixed grid thermal screen.

Referring now to FIG. 10, the numeral 102 identifies generally another embodiment of a fixed grid having an outer rim 104 within which are fastened a plurality of horizontally curved rods 106 intersecting with a plurality of vertically curved rods 108. A space is defined by ribs 106 and 108 vary in size and shape and provide a varied contact area for organisms drawn through grid 102. As with grid 94, grid 102 can be used as one or more of plates 24, 26 or 28.

Figure 11:
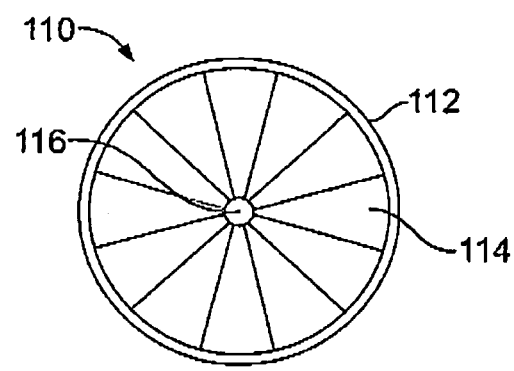
FIG. 11 is a schematic view of a rotatable fan.

Referring now to FIG. 11, the numeral 110 identifies generally a fan-type plate having an outer supporting frame 112 in which a fan assembly having a plurality of blades 114 is supported. Blades 114 are rotatably mounted to a hub 116. Assembly 110 may be powered by a motor, such as an electric motor (not shown) or blades 114 may be angled such that fan assembly 110 rotates in the air stream drawn through apparatus 10.

It is anticipated that fan assembly 110 will provide a mechanical killing force to organisms drawn through when organisms drawn through blades 114 contact said organisms.

It may also be a feature of fan assembly 110 to heat blades 114 to temperatures sufficient to add an additional killing element. As described above, an assembly 110 may be used as one or more plates 24, 26, or 28.

It is also a feature of the present invention that fan assemblies such as 110 may be mounted to grids such as fixed grids 94 and 102, preferably in the center of each. In addition to the mechanical killing capability of fan assemblies such as 110 it is also expected that the air flow provided by such fan assemblies will also assist in clearing the grids of organisms that may become attached thereto. For example, fan assembly such as 110 positioned between a pair of fixed grids such as 94 or 102 can produce a vacuum sufficient to a draft to pull organisms off the front of the upstream grid without blowing them from the rear of the downstream grid.

Figure 12:
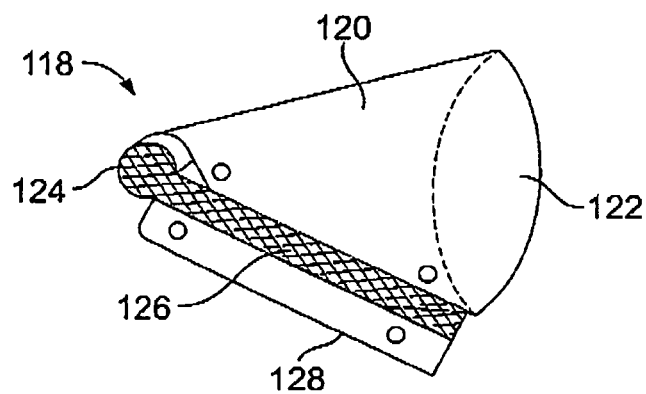
FIG. 12 is a schematic view of a kill chamber.

Referring to FIG. 12, the numeral 118 identifies generally a killing chamber to be used to collect and kill organisms drawn through apparatus 10. Chamber 118 is a generally conical wall 120 with an open end 122 and a closed end 124. A fine mesh 126 can be used as an exhaust for air drawn into chamber 118. Mesh 126 may also be formed of a heatable material such as stainless steel and heated to a temperature sufficient to kill any organisms that survive the trip to collector 118. A mounting flange 128 is provided to attach chamber 118 with an apparatus 10. It is a feature of the invention that chamber 118 can be easily removed, washed and returned to service.

Figures 13, 14:
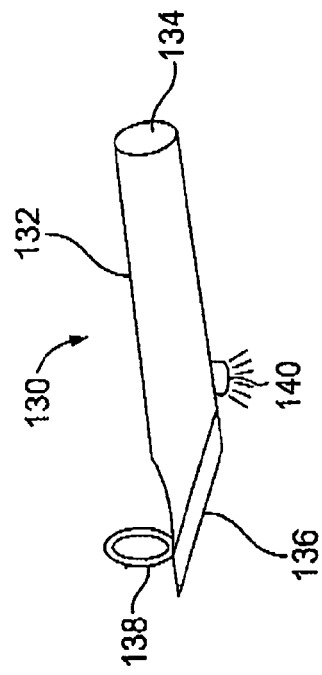
FIG. 13 is a schematic view of a nozzle having an integral magnifying glass and light.
FIG. 14 is a chart listing temperatures and kill times for various insects.

Referring now to FIG. 13, the numeral 130 identifies generally another embodiment of a collection wand having a tubular body 132 terminating at a first end 134 at a port attachable to port 92 of hose 90. Wand 130 also has a collection port 136 at its distal end.

A magnifier 138 is mounted to wand 130 proximate distal end 136 to assist a user in locating dead bugs and their eggs and larvae for collection. Wand 130 also includes a light 140 formed proximate collection port 136 to provide additional assistance in locating adult bed bugs, their eggs and larvae for collection and destruction. It is understood that positions of magnifier 138 and 140 may be varied to provide for a desired view of the area to be treated. It is also understood that expedients such as magnifier 138 and light 140 may also be included in the various collection nozzles described hereinabove.

Referring now to FIG. 14, a chart 142 provided informs the user of the time in minutes to eliminate 100 percent of various insect populations at various temperatures. For example, at 115° Fahrenheit it will take approximately 480 minutes to destroy 100 percent of bedbug eggs, 90 minutes to destroy 100 percent of the bed bug adult insect population, 58 minutes to destroy 100 percent of German cockroaches collected, 123 minutes to destroy 100 percent of any flour beetles collected, 264 minutes to destroy 100 percent of any dry wood termite nymphs collected, and 8 minutes to destroy 100 percent of any Argentine adult ants collected.

Chart 142 demonstrates that, at a temperature of 130° Fahrenheit 100 per cent of bedbug eggs and adults are destroyed in less than one minute while destruction of German cockroaches takes 7 minutes, adult flour beetles takes 4 minutes, dry wood termite nymphs takes 6 minutes and adult Argentine ants takes 1 minute. It can readily be seen that designing a collection apparatus with the capability of maintaining temperatures in the 125 to 130° Fahrenheit range will provide superior killing times and qualities for bedbug eggs and adults and improved qualities for destroying other insects.

It is a feature of the present invention to have a collection chamber capable of maintaining a steady temperature in a range sufficiently high to kill selected organisms within a relatively short time period. To that effect, chamber 118 can include an electrically energized heat sink, positioned proximate mesh 126 to provide an additional killing capability for collected insects.

I claim:

1. Apparatus for the collection and destruction of organisms, said apparatus comprising:
   a housing having a housing inlet at one end thereof;
   a fan assembly in communication with said housing inlet for drawing a vacuum to create an airstream through said housing inlet and into said housing, said fan assembly positioned in said airstream and having rotatable blades for contacting said airstream whereby said blades are for mechanically contacting and impacting said organisms aspirated through said housing inlet, said blades being heated to a degree sufficient to kill said organisms; and
   a collector for collecting said organisms aspirated through said housing inlet.

2. The apparatus as recited in claim 1 further comprising at least one heated grid positioned in said airstream.

3. The apparatus as recited in claim 1
   further comprising a heat retaining thermal mass heated to a temperature sufficient to kill said organisms.

4. The apparatus as recited in claim 3 wherein said thermal mass comprises an electrically energized heating element heated to a temperature sufficient to kill said organisms.

5. The apparatus as recited in claim 1 wherein the temperature of said blades is adjustable.

6. The apparatus as recited in claim 1 wherein said collector is formed from an electrically conductive material whereby electrical energy can be applied to said material to raise the temperature of said material to a degree sufficient to kill said organisms.

7. The apparatus as recited in claim 1 wherein said fan assembly is adjustable to adjust the flow rate of said airstream.

8. The apparatus as recited in claim 1 wherein said inlet comprises a nozzle.

9. The apparatus as recited in claim 8 wherein said nozzle includes a light.

10. The apparatus as recited in claim 8 wherein said nozzle includes a magnifying glass.

11. The apparatus as recited in claim 1 wherein said organisms comprise at least one of: bedbugs; bedbug eggs; and bedbug larvae.

* * * * *